Aug. 19, 1958

M. Z. MARTIN ET AL 2,847,811

MOBILE HARVESTING MACHINE

Filed Aug. 4, 1955

INVENTORS
*Menno Z. Martin,*
and *Phares Martin*
BY
*Alfred E. Schinger*
ATTORNEY.

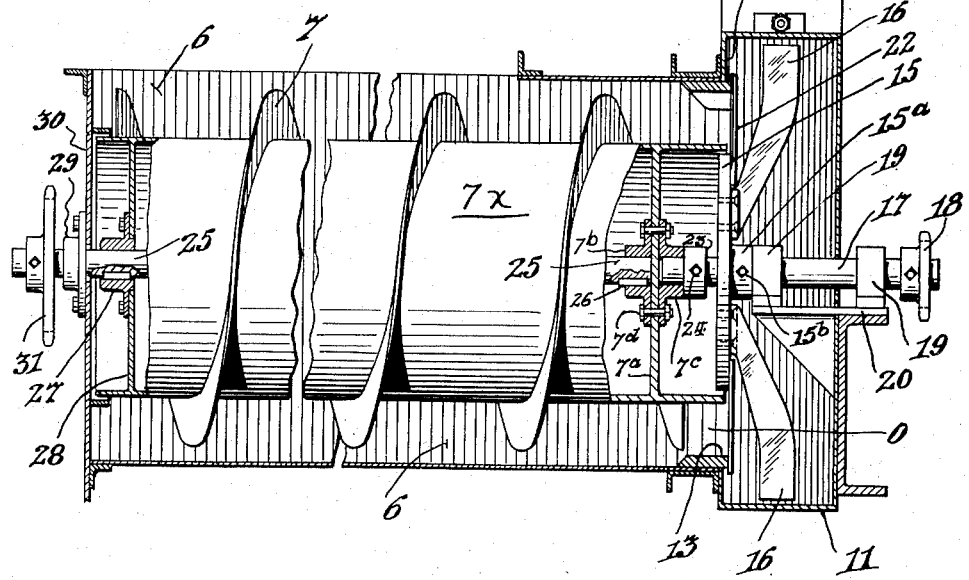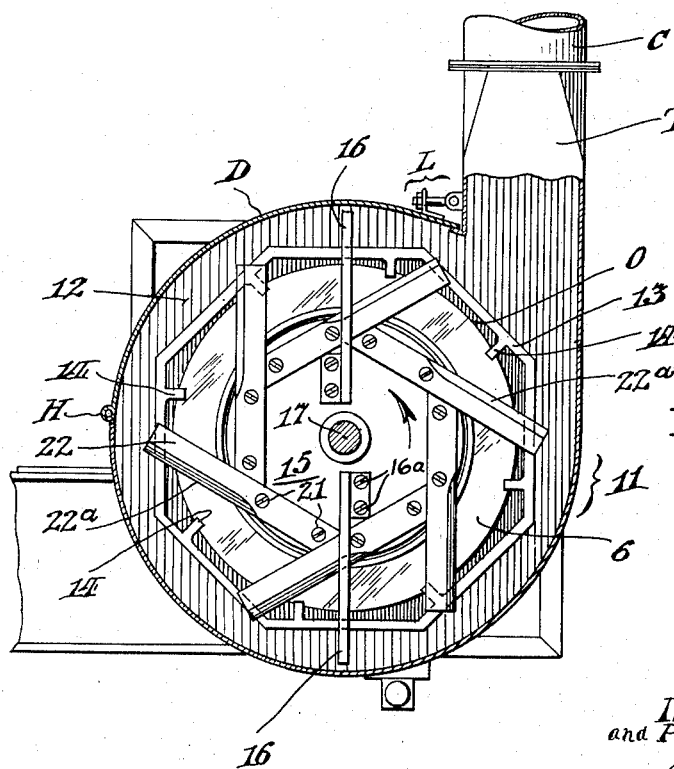

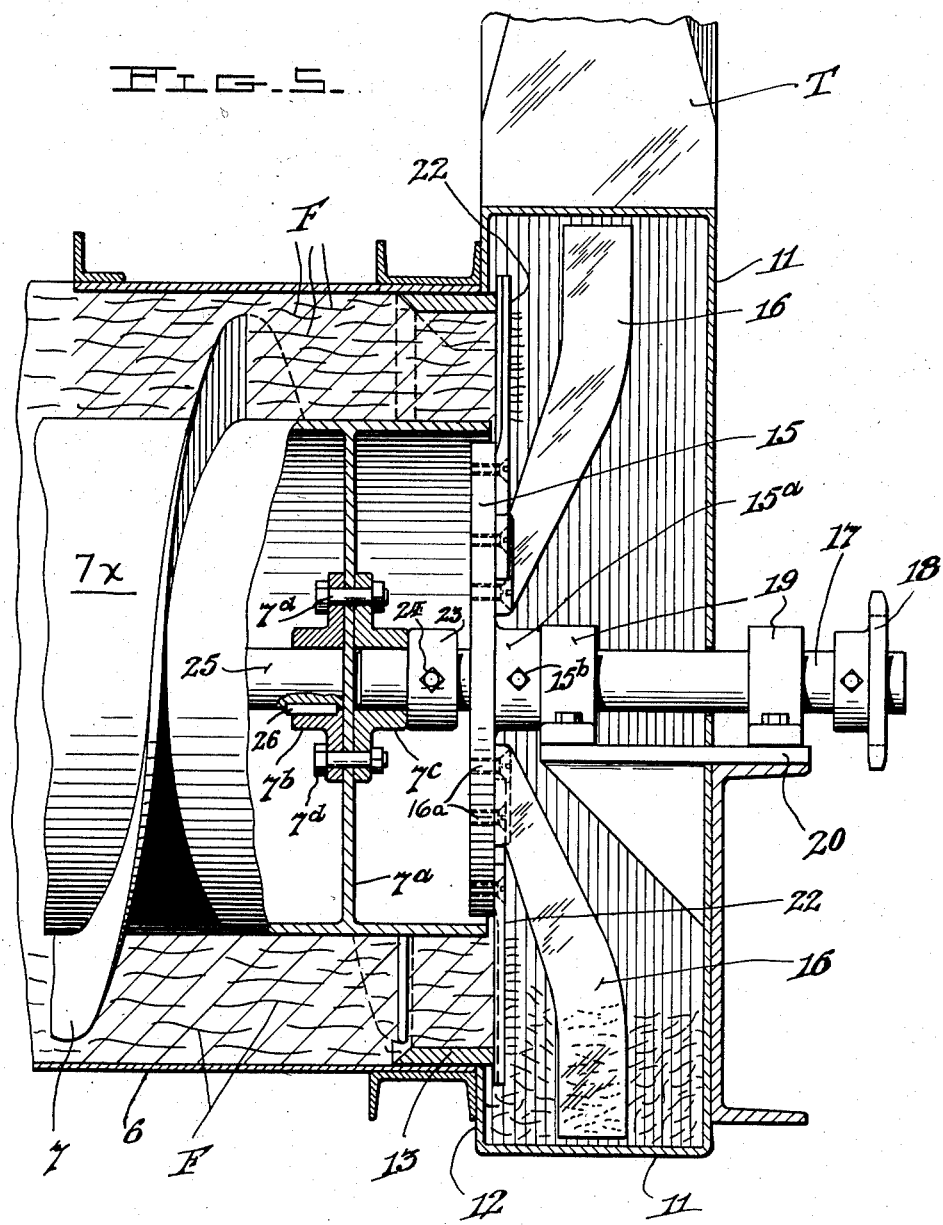

United States Patent Office 2,847,811
Patented Aug. 19, 1958

2,847,811

MOBILE HARVESTING MACHINE

Menno Z. Martin and Phares Martin, New Holland, Pa., assignors to Sperry Rand Corporation, New Holland, Pa., a corporation of Delaware Application August 4, 1955, Serial No. 526,373

4 Claims. (Cl. 56—1)

This invention relates to ambulant, or mobile, harvesting machines utilized for severing and gathering forage crops and the like, and more particularly concerns a unique machine of this type which not only simultaneously severs and gathers the forage material, but also shreds it and impels and conveys the shredded material to a collecting or other location.

One object of our invention is to provide a novel and unique ambulant harvesting machine, or apparatus, of the type indicated.

Another object is to provide such a machine which embodies certain structural and functional features of advantage over the similar machines of the prior art.

Another object is to provide such a machine having novel means embodied therein which is capable of performing certain special operations on the forage material severed and gathered by the machine, which operations cannot presently be performed by the similar prior art harvesting machines, thereby to eliminate the time, trouble, labor and expense, involved in performing such special operations separately and with separate equipment, or means, as required in accordance with the prior art practice.

A further object is to provide novel means which is adapted to be cooperatively combined with an ambulant harvesting machine that severs and gathers forage material and the like, and constructed so as to either form an integral part of such a machine, or constructed to form auxiliary equipment for such a machine, and which means is adapted to function in synchronized relation with the machine mechanisms that effect the severing and gathering of the forage material so as to additionally shred the severed material, as well as to impel and convey the shredded material to a collecting or other location, in a continuous operation.

An additional object is to provide an ambulant harvesting machine which has an elongated cutter bar at its forward end extending transversely to the direction of travel of the machine, a trough behind the cutter bar disposed so as to receive the material severed by the cutter bar, an auger rotatably mounted lengthwise within the trough so as to effect feeding of the severed material received by the trough to one end thereof, and material shredding means operatively disposed in transverse relation at the end of the trough to which the severed material is moved by the auger, in such manner as to establish a certain synchronized relation between the feeding advancement of the severed material and the shredding action performed by said material shredding means.

Another object is to provide such a machine having a single auger which performs the dual function of advancing the material severed by the cutting means of the machine to one end of a material receiving trough, and at the same time moves the material arriving at said end of the trough, into position for action thereon by a unique material shredding device.

Another feature of the invention resides in the provision of an ambulant harvesting machine having a novel forage material shredding mechanism.

Another object is to provide such a forage material shredding mechanism which comprises a frame or housing structure arrangement having a guide opening through which the material severed and gathered by the machine is moved, a disc-like member of lesser diameter than said opening rotatably mounted in axially aligned relation at said opening, a plurality of cutting blades secured to said disc-like member in such manner that the cutting edges of the blades extent substantially from the perimeter of the member to one side of the guide opening defining portion of the frame structure arrangement, and means for rotating said disc-like member in a certain speed relation with the feeding advancement of the severed material.

Other objects are to cooperatively combine with such a forage material shredding mechanism, one or more novel features such as paddle means adapted to impel the shredded material in a certain direction, conduit means through which the shredded material is directed to its place of destination, operating means adapted to effect functioning of the material shredding and impelling means in a certain timed relation with the other moving machine parts, and control means for selectively starting and stopping the material shredding and conveying mechanism.

With these and other objects in view, which will become more readily apparent from the following detailed description of the practical and illustrative harvesting machine improvements shown in the accompanying drawings, our invention comprises the novel harvesting machine, mechanisms, devices, elements, features of construction and arrangement of parts in cooperative relationship as more particularly indicated and defined by the hereto appended claims.

In the accompanying drawings:

Fig. 3 is an enlarged, elevational sectional view taken substantially as indicated by the arrows 3—3 on Fig. 1, certain parts of which are shown in full and others broken away in order to more clearly disclose certain structural details.

Fig. 4 is an enlarged, elevational sectional view, taken substantially as indicated by the arrows 4—4 on Fig. 1, and Fig. 5 is a greatly enlarged elevational sectional view, similar to the right end portion of Fig. 3, showing severed forage material being advanced and shredded by the novel means of our invention.

Figure 1:
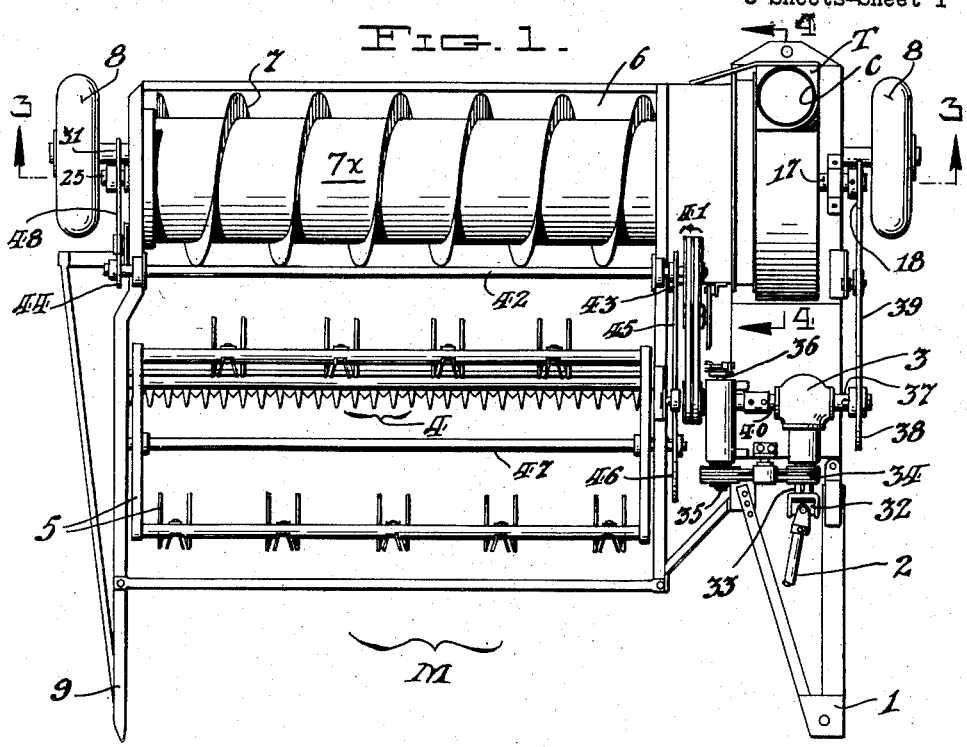
Figure 1 is a plan view of a harvesting machine constructed according to one embodiment of our invention.

It will facilitate an understanding of our invention to first briefly consider some of the more important aspects and phases thereof, so that these may be kept in mind when subsequently reading the detailed description of the practical and exemplary embodiment of our improvements disclosed in the drawings.

Accordingly, it is noted that the ambulant, or mobile, harvesting machine, or apparatus, of our invention is adapted to be connected to a standard, or conventional, power tractor or the like, so as to be drawn, or pulled thereby, in the usual systematic order, across a field containing a crop of forage forming vegetation, or material, for the purpose of severing, gathering, reducing to shredded form, or to a certain size, and impelling and conveying the shredded material to a collecting or other location, all in one continuous operation.

Figure 2:
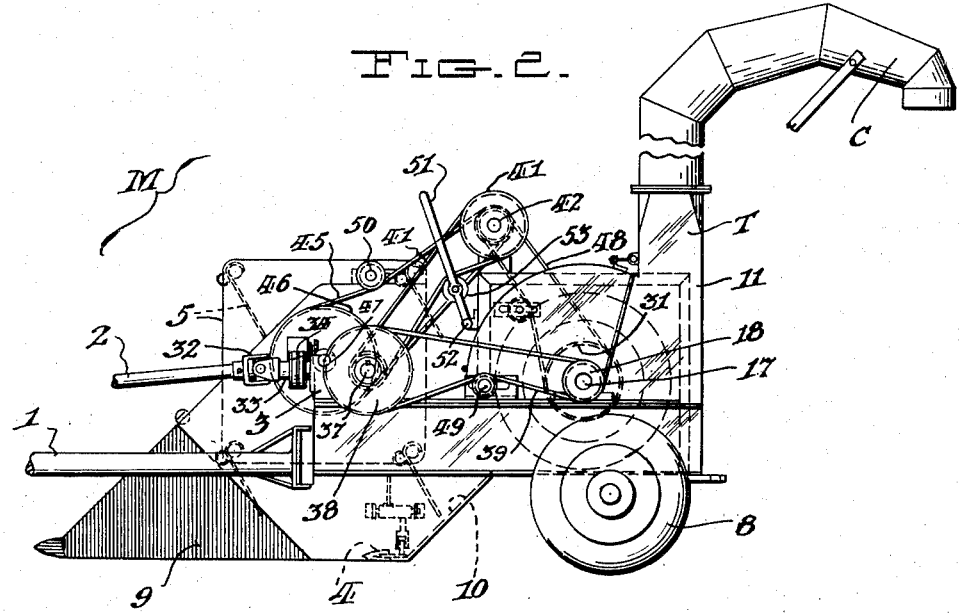
Fig. 2 is a side elevational view of the machine of Fig. 1, as seen by looking at the latter from the right.

The novel harvesting machine improvements and their mode of operation in accordance with my invention, will become clear from the following detailed description thereof, reference being had to the accompanying drawings in which similar parts are designated by corresponding reference characters:

In Figs. 1 and 2, the harvesting machine, or apparatus, of our invention is generally indicated by the letter M. This machine embodies certain usual and well known parts also embodied in the similar prior art harvesting machines, such as, a connecting frame or structure 1, which is arranged to permit quick and easy separable connection of the machine to a standard, or conventional power tractor or the like; a drive shaft 2, which is adapted to be separably connected with a suitable rotatable power furnishing element of the tractor; a differential gear unit 3; a reciprocatively operable cutter bar unit 4; a continuously travelling rake arrangement 5; a forage material receiving or collecting trough 6; an auger 7; machine wheels 8; a ground contacting machine guide member, or runner 9; and an inclined surface member 10 that extends from the cutter bar unit 4 to the trough 6, along which member 10 the forage material is moved by the rake arrangement 5 so as to become deposited in the trough 6, subsequent to severance of the material by the cutter bar unit 4.

The forage material receiving or collecting trough 6 is arranged rearwardly of the cutter bar unit 4, and the latter is arranged to extend transversely to the forward direction of travel of the machine, substantially at ground level.

The auger 7 is of the usual type embodied in prior art harvesting machines and is rotatably mounted lengthwise in the trough 6, so as to extend from one end of the latter to the other.

The parts so far identified are structurally and functionally the same as the similar parts embodied in conventional prior art harvesting machines and consequently form no part of our invention, except insofar as said parts are cooperatively combined with the hereinafter described parts of our invention to accomplish the new results thereof.

Rotation of the auger 7 is arranged to effect movement of the forage material severed by the cutter unit 4 and received in the trough 6 within and along the latter, from left to right, as seen in Fig. 1, and at the right end of said trough 6 there is provided in transversely operable relation to the auger 7, a novel mechanism in accordance with our invention. This mechanism generally comprises a housing structure 11, having a wall 12 extending in transverse relation and immediate to the end of the auger 7, which wall is provided with an opening O, as defined by an annularly extending octagonally-shaped metallic frame element or shear bar 13 having integrally formed therewith and extending inwardly therefrom in uniformly spaced relation, a series of knife elements or projections 14; a disc-like knife support member 15; paddle-like elements 16; a shaft 17 on one end of which is fixedly mounted a sprocket wheel 18; two similar bearings 19 in which the shaft 17 is mounted for free rotation and which bearings are secured to a stationary support 20.

The disc-like member 15 has formed therewith an integral hub 15ª through which extends the shaft 17, and a screw bolt 15ᵇ is arranged to extend through the wall of the hub 15ª so as to effect locking connection of the hub to the shaft 17. As clearly shown in Figs. 3 and 4, the disc-like member 15 is of lesser diameter than the wall opening or inlet O defined by the octagonally-shaped shear bar 13. Further, member 15 is of less diameter than the diameter of the tubular body 7x of auger 7; and as clearly shown in Fig. 3, member 15 fits into the tubular auger body. Secured to one side of the disc-like member 15, by means of screws 21, are a series of uniformly relatively spaced cutting elements 22, having cutting edges 22ª. The portions of the elements 22 provided with the cutting edges 22ª extend from the perimeter of the disc-like member 15 for contacting sliding relation along a side edge of the octagonally-shaped shear bar 13, which side edge is machined so as to present a smooth surface for such sliding action of the cutting elements 22 therealong.

The paddle-like elements or fan blades 16 are secured by screws 16ª, in opposed or radially extending relation, to the same side of the disc-like member 15, as the cutting elements 22, as clearly shown in Figs. 3 and 4.

The disc-like member 15 is arranged to be rotated in the direction of the arrow shown in Fig. 4, in axially aligned relation with the auger 7 and the opening O, at the location clearly shown in Figs. 3 and 5, so that the cutting edges 22ª of the elements 22 will be moved, or will sweep across, the annular space provided for feeding movement of the forage material, indicated at F in Fig. 5, between shear bar 13 and the body portion 7x of the auger 7.

In order that the auger 7 and disc-like member 15 may be rotated at different speeds relative to each other and in order that the right end of the auger 7 may be rotatably mounted so that it may carry out the feeding movement of the forage material F as just explained, the cylindrical body portion 7x of the auger 7 is provided with an internal transversely extending wall structure 7ª having centrally and fixedly secured thereto at each side thereof, two bearing members 7ᵇ and 7ᶜ, by means of bolts 7ᵈ. The wall structure 7ª is shown as integrally formed with the cylindrical body of the auger 7 for illustrative purposes, but it will be understood that said wall structure 7ª can be readily provided in the form of a separate circular member having a securing flange, or tabs, extending in right-angular relation along its perimeter.

One end of the shaft 17 extends into the bearing member 7ᶜ and is positionally retained therein in freely rotatable manner, by a collar 23 that is secured to the shaft 17 by a set screw or bolt 24. The right end of a shaft 25, which extends centrally of the auger 7, is secured by a key element 26 in the bearing 7ᵇ, and the other, or left, end of said shaft 25 extends through and is similarly fixedly secured to a bearing 27 which is bolted to a wall structure 28 at the left end of the cylindrical body portion of the auger 7. The shaft 25 also extends through a bearing 29 that is bolted to a wall 30 that is arranged to close the left end of the trough 6. At its free left end, the shaft 25 has secured thereto a sprocket wheel 31. It will be noted that the arrangement just described, permits independent rotary movement of the disc-like member 15 and its therewith associated parts, relative to the auger 7, while the double bearing arrangement 7ᵇ and 7ᶜ, on the wall structure 7ª of the auger 7, makes it possible to support the latter on the end of the shaft 17 in such manner that the auger 7 can effectively and efficiently impel, or feed, the cut forage through the annular space F, for further action thereon by the cutting elements 22 and paddles 16.

By referring to Figs. 2, 3, 4 and 5, it will be noted that the housing structure 11 has a lower circular portion arranged in surrounding relation to the disc-like member 15 and its associated parts, and is provided with an upwardly extending tubular outlet forming member T at one side thereof through which the shredded material is impelled by the action of the paddles 16 when the latter are rotated in the direction of the arrow shown in Fig. 4, and the shredded forage material drops to the bottom of the housing after being cut by the elements 22 in the manner indicated in Fig. 5. Secured to the tubular outlet forming member T is a conduit C of the usual extensible and adjustable type used with harvesting machinery to direct or convey the material forced therethrough to a desired collecting or other location. The conduit C may be arranged so as to convey the shredded material impelled by the paddles 16 to a wagon, or truck positioned beneath the outlet end of the conduit C so as to receive the shredded forage material while moving along in unison with the harvesting machine.

The housing 11 is also provided with a door D that is hingedly connected at its lower end, as indicated at H, and provided with a locking arrangement at its upper end, as indicated at L. By unlocking the said door D and swinging it open, the interior of the housing is made readily accessible to the operator of the machine.

The operating parts of the harvesting machine are actuated by the power driven shaft 2, by the usual motion transmitting and translating means, more or less schematically or diagrammatically indicated in Figs. 1 and 2, and as follows:

The end of the power driven shaft 2 is connected by a universal joint 32, with a shaft 33 that extends to and operates the differential unit 3. The shaft 33 is connected by a sprocket and chain arrangement 34 with the end of a shaft 35, the other end of which shaft is provided with a usual eccentric arrangement 36 that reciprocatively operates the cutter bar unit 4.

Extending from one side of the differential unit 3 is a shaft 37 on the outer end of which is fixedly mounted a sprocket wheel 38 that is connected by a sprocket chain 39 with the sprocket wheel 18 arranged to drive the shaft 17.

Extending from the other side of the differential unit 3 is a shaft 40 that transmits its motion through a double V-belt drive arrangement 41, to shaft 42 having secured thereto two sprocket wheels 43 and 44. The sprocket wheel 43 is connected by a sprocket chain 45 with a sprocket wheel 46 fixed on a shaft 47 arranged to rotatively operate the rake arrangement 5, in usual and well known manner. The sprocket wheel 44 is connected by a sprocket chain 48 with the sprocket wheel 31 fixed to the auger shaft 25.

An adjustably mounted tension applying roller 49 is arranged for cooperative relation with the chain 39, as clearly indicated in Fig. 2.

Similarly, an adjustably mounted tension applying roller 50 is arranged for cooperative relation with the sprocket chain drive arrangement 45, as clearly indicated in Fig. 2.

To effect connection or disconnection of the double belt driving arrangement 41, with the shaft 40 of the differential unit 3, there is provided a lever 51 that is pivotally connected at 52 to a fixed machine frame member. The lever 51 has mounted thereon for free rotation a tension applying roller 53 adapted to be simultaneously contactingly engaged with both belts of the double belt drive arrangement 41, as indicated in Fig. 2, and selectively positioned in belt tensioning location, or in belt tension releasing position.

The motion transmitting means arranged between the shaft 40 and the auger shaft 25, and between the shaft 37 and the shaft 17 that drives the disc-like member 15, is such, as to effect revolution of the auger 7 at a speed of 200 R. P. M., and the disc-like member at a speed of 1,000 R. P. M. In other words, the auger 7 and disc-like member 15 are driven at a speed ratio of 1 to 5.

Operation

As previously pointed out, the harvesting machine M has the frame 1 connected to a conventional farm tractor, or the like, so as to be pulled thereby across a field of ready to harvest forage material, or the like, in the usual systematic manner. At the same time the shaft 2 is connected to suitable power means of the tractor, for rotation thereof.

As the tractor is pulled forward on its wheels 8, the cutter unit 4 operates to cut the forage material, the rake arrangement 5 operates, as usual, to move the cut forage material up the inclined surface member 10 and into the receiving or collecting trough 6, so that it will be moved by the auger 7 to the trough end where the transversely operable forage shredding mechanism is located. The cut forage material is then moved by the auger 7 through the annular space defined by shear bar 13 and the cylindrical body 7x of the auger 7 at the location of the disc-like member 15. As the cut forage material passes into the housing 11, the forage material is steadied against lateral movement by the fixed knife projections 14, for effective and efficient shredding, or fine cutting, by the fast revolving cutting blades or elements 22. The shredded material then drops to the bottom of the lower circular portion of the housing 11, and in doing so, is impelled by the paddles 16 into the tubular outlet forming member T and from there through the conduit C, so that it will be discharged from the outlet end thereof into a collecting truck or other vehicle hitched to, or otherwise arranged to follow, the harvesting machine for this purpose.

Modifications

Of course, it will be apparent to those skilled in this art, that the improvement specifically shown and described, can be changed, varied, or modified, in various ways, without departing from the invention herein disclosed and hereinafter more particularly defined by the appended claims.

We claim:

1. In a forage harvester, a housing having an inlet, an annular shear bar mounted in said inlet and defining a feed opening, means for feeding crop material through said feed opening, said feeding means comprising an auger having a discharge end porjecting into said feed opening, said auger having a body portion at said discharge end the diameter of which is less than the diameter of said feed opening to thereby provide an annular space for the passage of material, and cutting means within said housing, said cutting means comprising a knife support disc disposed at said discharge end of said auger and extending in a plane transverse to the axis of rotation of the auger, said knife support disc being rotatable about a common axis with said auger and having a diameter less than the diameter of said auger body, one knife at least carried on said knife support disc and having a cutting portion extending beyond the periphery of the disc and across said annular space whereby said cutting portion is continuously engageable with material delivered through said space.

2. A forage harvester as recited in claim 1, wherein a single means is provided for mounting both said cutting means and said discharge end of said auger, and drive means being provided to operate said auger at one speed and said cutting means at another speed.

3. A forage harvester as recited in claim 1, wherein said housing has an outlet opening, and said disc carries a plurality of fan blades for blowing crop material, after it is shredded by said cutting means, through said outlet.

4. In a forage harvester, a housing having an inlet and an outlet, an annular shear bar mounted in said inlet and defining a feed opening, means for feeding crop material through said feed opening, said feeding means comprising a rotatable auger having a discharge end projecting into said feed opening, said auger having a body portion at said discharge end the diameter of which is less than the diameter of said feed opening to thereby provide an annular space for the passage of material, cutting means, means for mounting said cutting means in said housing for rotation independently of and at a different speed than the speed of rotation of said auger, said cutting means being rotatable coaxially of said auger and having a knife projecting across said feed opening and cooperative with said shear bar to exert a continuous shearing action on the material fed into said housing through said annular space, and fan means within said housing for blowing crop material cut by said cutting means through said outlet.

(References on following page)

References Cited in the file of this patent

UNITED STATES PATENTS

| | | |
|---|---|---|
| 2,401,236 | Fielitz | May 28, 1946 |
| 2,507,742 | Tuft | May 16, 1950 |
| 2,524,751 | Berger | Oct. 10, 1950 |
| 2,571,652 | Bass | Oct. 16, 1951 |
| 2,641,097 | Mast | June 9, 1953 |
| 2,701,595 | Berger et al. | Feb. 8, 1955 |

FOREIGN PATENTS

| | | |
|---|---|---|
| 612,143 | Great Britain | Nov. 9, 1948 |